(12) United States Patent
Shung-Lin

(10) Patent No.: US 8,584,347 B2
(45) Date of Patent: Nov. 19, 2013

(54) METHOD FOR WINDING STATOR CORE FOR MOTOR

(75) Inventor: Chung Shung-Lin, Taipei (TW)

(73) Assignee: Taigene Electric Machinery Co., Ltd., Taipei (TW)

( * ) Notice: Subject to any disclaimer, the term of this patent is extended or adjusted under 35 U.S.C. 154(b) by 422 days.

(21) Appl. No.: 12/880,355

(22) Filed: Sep. 13, 2010

(65) Prior Publication Data

US 2011/0273051 A1    Nov. 10, 2011

(30) Foreign Application Priority Data

May 5, 2010    (TW) ................................ 99114296 A

(51) Int. Cl.
*H02K 15/00*    (2006.01)
(52) U.S. Cl.
USPC ................. 29/596; 29/606; 29/736; 242/433
(58) Field of Classification Search
USPC ............ 29/596–598, 564.1–564.4, 732–736; 310/195, 67 R, 71, 201; 242/432–433
See application file for complete search history.

(56) References Cited

U.S. PATENT DOCUMENTS

| | | | | |
|---|---|---|---|---|
| 3,879,842 | A | * | 4/1975 | McKinley et al. ............... 29/596 |
| 4,358,099 | A | * | 11/1982 | Hamane et al. ................. 269/93 |
| 4,426,771 | A | * | 1/1984 | Wang et al. ..................... 29/596 |
| 4,724,604 | A | * | 2/1988 | Kawazoe et al. ............... 29/606 |
| 5,113,573 | A | * | 5/1992 | Taji et al. ........................ 29/596 |
| 5,316,227 | A | * | 5/1994 | Oohashi et al. ............. 140/92.2 |
| 5,732,900 | A | * | 3/1998 | Burch ......................... 242/432.5 |
| 6,749,144 | B2 | * | 6/2004 | Komuro et al. ............ 242/432.5 |
| 2011/0273051 | A1 | * | 11/2011 | Shung-Lin ..................... 310/195 |

* cited by examiner

*Primary Examiner* — Minh Trinh
(74) *Attorney, Agent, or Firm* — Sturm & Fix LLP

(57) ABSTRACT

The present invention provides a stator core winding method for a motor and a structure thereof. The method includes preparing a stator core including a plurality of core cavities; winding a pair of second-phase coils into the plurality of core cavities of the stator core; winding a pair of first-phase coils, a pair of the second-phase coils and two pairs of third-phase coils into the plurality of core cavities of the stator core; and winding two pairs of the first-phase coils, a pair of the second-phase coils and a pair of the third-phase coils into the plurality of core cavities of the stator core.

7 Claims, 9 Drawing Sheets

```
┌─────────────────────────────────────────┐
│ preparing a stator core and an inserting jig │─── 401
└─────────────────────────────────────────┘
                    │                           ┌─── 402
                    ▼
┌───────────────────────────────────────────────────────────────┐
│ putting first phase coils on the strip-shaped portions of the inserting jig corresponding to │
│ the positions of the cavity walls between the first core cavity and the second core cavity │
│ and between the seventh core cavity and the eighth core cavity, putting a second phase │
│ coil on the strip-shaped portion of the inserting jig corresponding to the position of the │
│ cavity wall between the fifth core cavity and the sixth core cavity, and putting a third │
│ phase coil on the strip-shaped portion of the inserting jig corresponding to the position │
│ of the cavity wall between the third core cavity and the fourth core cavity │
└───────────────────────────────────────────────────────────────┘
                    │                                                      ─── 403
                    ▼
┌───────────────────────────────────────────────────────────────┐
│ putting the first phase coil on the strip-shaped portion of the inserting jig corresponding to the │
│ position of the cavity wall between the fourth core cavity and the fifth core cavity, putting the │
│ second phase coil on the strip-shaped portion of the inserting jig corresponding to the position of the │
│ cavity wall between the second core cavity and the third core cavity, and putting the third phase │
│ coils on the strip-shaped portions of the inserting jig corresponding to the positions of the cavity │
│ walls between the first core cavity and the ninth core cavity and between the sixth core cavity and │
│ the seventh core cavity │
└───────────────────────────────────────────────────────────────┘
                    │                                                      ─── 404
                    ▼
┌───────────────────────────────────────────────────────────────┐
│ putting the second phase coil on the strip-shaped portion of the inserting jig corresponding │
│ to the position of the cavity wall between the eighth core cavity and the ninth core cavity │
└───────────────────────────────────────────────────────────────┘
                    │                                                      ─── 405
                    ▼
┌───────────────────────────────────────────────────────────────┐
│ placing the top of the inserting jig into the stator core to render the outer surfaces of the strip-shaped │
│ portions to attach the edges of the cavity walls adjacent to the center of the stator core, and moving a │
│ plurality of pushing elements of the inserting jig upwards to pass through the stator core │
└───────────────────────────────────────────────────────────────┘
```

401 — preparing a stator core and an inserting jig

402 — putting first phase coils on the strip-shaped portions of the inserting jig corresponding to the positions of the cavity walls between the first core cavity and the second core cavity and between the seventh core cavity and the eighth core cavity, putting a second phase coil on the strip-shaped portion of the inserting jig corresponding to the position of the cavity wall between the fifth core cavity and the sixth core cavity, and putting a third phase coil on the strip-shaped portion of the inserting jig corresponding to the position of the cavity wall between the third core cavity and the fourth core cavity 403 — putting the first phase coil on the strip-shaped portion of the inserting jig corresponding to the position of the cavity wall between the fourth core cavity and the fifth core cavity, putting the second phase coil on the strip-shaped portion of the inserting jig corresponding to the position of the cavity wall between the second core cavity and the third core cavity, and putting the third phase coils on the strip-shaped portions of the inserting jig corresponding to the positions of the cavity walls between the first core cavity and the ninth core cavity and between the sixth core cavity and the seventh core cavity 404 — putting the second phase coil on the strip-shaped portion of the inserting jig corresponding to the position of the cavity wall between the eighth core cavity and the ninth core cavity 405 — placing the top of the inserting jig into the stator core to render the outer surfaces of the strip-shaped portions to attach to the edges of the cavity walls adjacent to the center of the stator core, and moving a plurality of pushing elements of the inserting jig upwards to pass through the stator core

Fig. 7

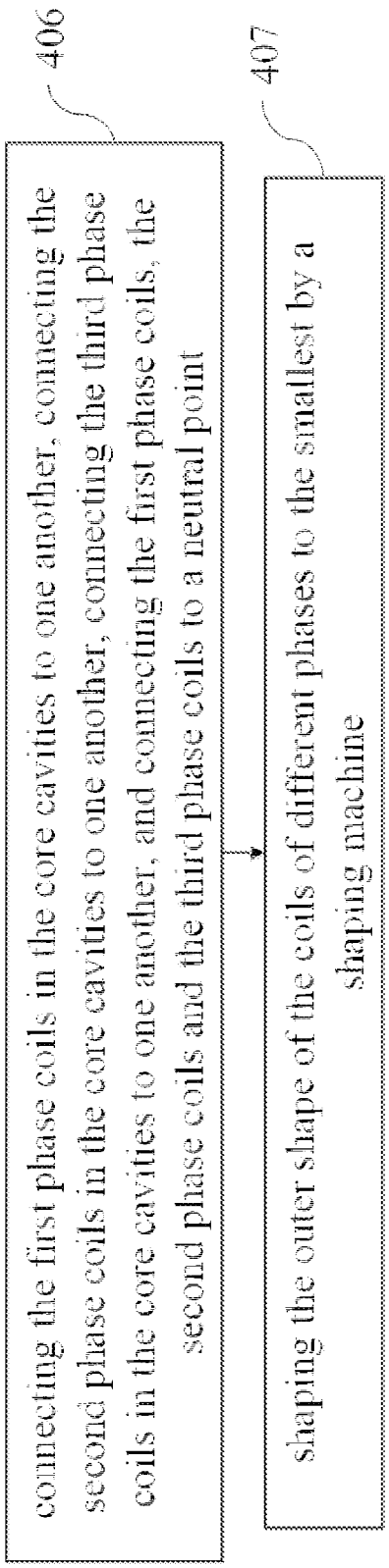

406 — connecting the first phase coils in the core cavities to one another, connecting the second phase coils in the core cavities to one another, connecting the third phase coils in the core cavities to one another, and connecting the first phase coils, the second phase coils and the third phase coils to a neutral point 407 — shaping the outer shape of the coils of different phases to the smallest by a shaping machine

Fig. 8

METHOD FOR WINDING STATOR CORE FOR MOTOR

FIELD OF THE INVENTION

The present invention relates to a motor, and more particularly to a stator core winding method for a motor.

BACKGROUND OF THE INVENTION

A stator of a motor generally includes a stator core made of a magnetic material, which includes an axially extended inner hole to receive a rotor. Generally, the stator core is made by stacking up and arranging multiple similar sheets in a frame and fixing them with a clamp or riveting them through projected points. A plurality of coils formed by insulated conductive wires are inserted into determined stator cavities in the stator core to render the coils to form U-turn areas in the end portion of the stator core. The coils are connected to one another to form coil assemblies or poles. The coils forming the so-called stator winding are usually covered with paints or enamels to form protective covering layers at the periphery of the coils, so as to form better insulation among the coils.

The coil assemblies included by a single-speed motor establish at least one set of winding. The coil assemblies are wound by a winding machine and are disposed on a coil inserting jig. The formed coils are inserted into the stator through for example the inserting jig subsequently, and therefore the coils are substantially aligned with the core cavities in the stator core. However, the traditional winding method is divided into three stages. Three single phase coils are inserted into the core cavities in the positions spaced apart with angles of 120 degrees during each winding stage, and the positions of the core cavities inserted in each stage are staggered with one another. The inductance unbalance of the three phase inductance of the stator core completed by the traditional method usually exceeds 1%, for example 2-3%.

Therefore, the motor manufactured with the stator core completed by the traditional method suffers poor performance because of high inductance unbalance.

Accordingly, there is still a need for a solution which can solve the aforementioned problem of high inductance unbalance.

SUMMARY OF THE INVENTION

To solve the aforementioned problem of high inductance unbalance, the present invention provides a stator core winding method for a motor and a structure thereof.

In one aspect, the present invention provides a stator core winding method for a motor, comprising preparing a stator core including a plurality of core cavities; winding a pair of second-phase coils into the plurality of core cavities of the stator core; winding a pair of first-phase coils, a pair of the second-phase coils and two pairs of third-phase coils into the plurality of core cavities of the stator core; and winding two pairs of the first-phase coils, a pair of the second-phase coils and a pair of the third-phase coils into the plurality of core cavities of the stator core.

Another advantage of the present invention is that the stator core winding method for the motor and the structure thereof of the present invention can enhance the performance of the motor greatly.

These and other advantages will become apparent from the following description of preferred embodiments taken together with the accompanying drawings and the appended claims.

BRIEF DESCRIPTION OF THE DRAWINGS

The present invention may be understood by some preferred embodiments and detailed descriptions in the specification and the attached drawings below. The identical reference numbers in the drawings refer to the same components in the present invention. However, it should be appreciated that all the preferred embodiments of the invention are only for illustrating but not for limiting the scope of the claims and wherein:

FIG. 7 illustrates a flow chart of the stator core winding method for the motor in accordance with one embodiment of the present invention;

FIG. 8 illustrates a flow chart of the stator core winding method for the motor in accordance with one embodiment of the present invention.

DETAILED DESCRIPTION OF THE PREFERRED EMBODIMENT

The invention will now be described with the preferred embodiments and aspects and these descriptions interpret structure and procedures of the invention only for illustrating but not for limiting the claims of the invention. Therefore, except the preferred embodiments in the specification, the present invention may also be widely used in other embodiments.

Figure 1:
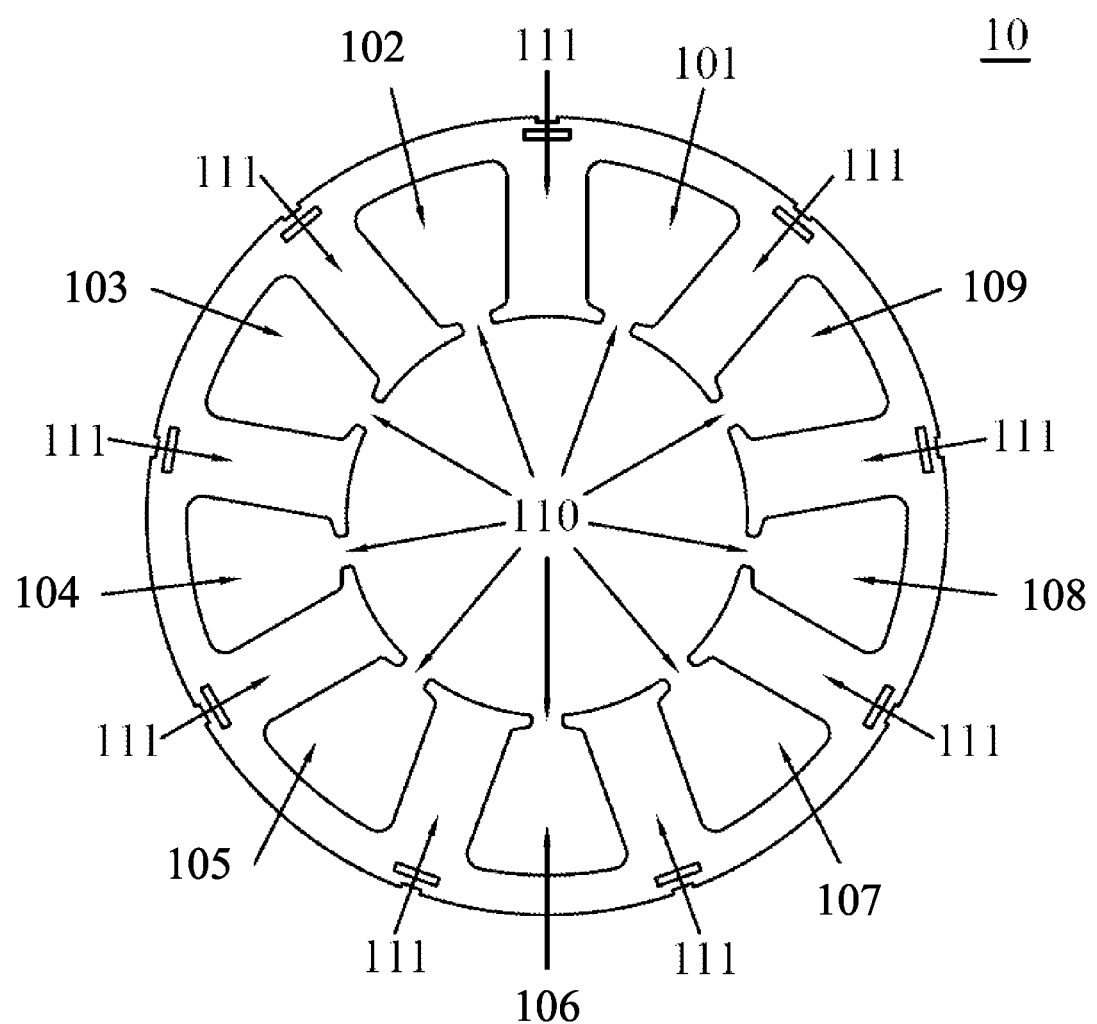
FIG. 1 illustrates a diagram of a stator core having nine core cavities in accordance with one embodiment of the present invention.

The present invention discloses a stator core winding method for a motor. The stator core of the motor generally is made of silicon steel sheets which are stacked up along the rotation axis of the motor. A plurality of core cavities are formed in the stator core to dispose coils of different phases into the core cavities. In one embodiment, the number of the core cavities may be 9, 12, 15 or 18. The aforementioned number of the core cavities is illustrated for example, but not for limiting the present invention. In one embodiment, as shown in FIG. 1, the stator core 10 includes a first core cavity 101, a second core cavity 102, a third core cavity 103, a fourth core cavity 104, a fifth core cavity 105, a sixth core cavity 106, a seventh core cavity 107, an eighth core cavity 108 and a ninth core cavity 109. As shown in FIG. 1, every core cavity includes a cavity opening 110 formed adjacent to the center of the stator core 10 in order for the coils to pass therethrough and enter every core cavity. A cavity wall 111 is formed between every core cavity.

Figure 2:
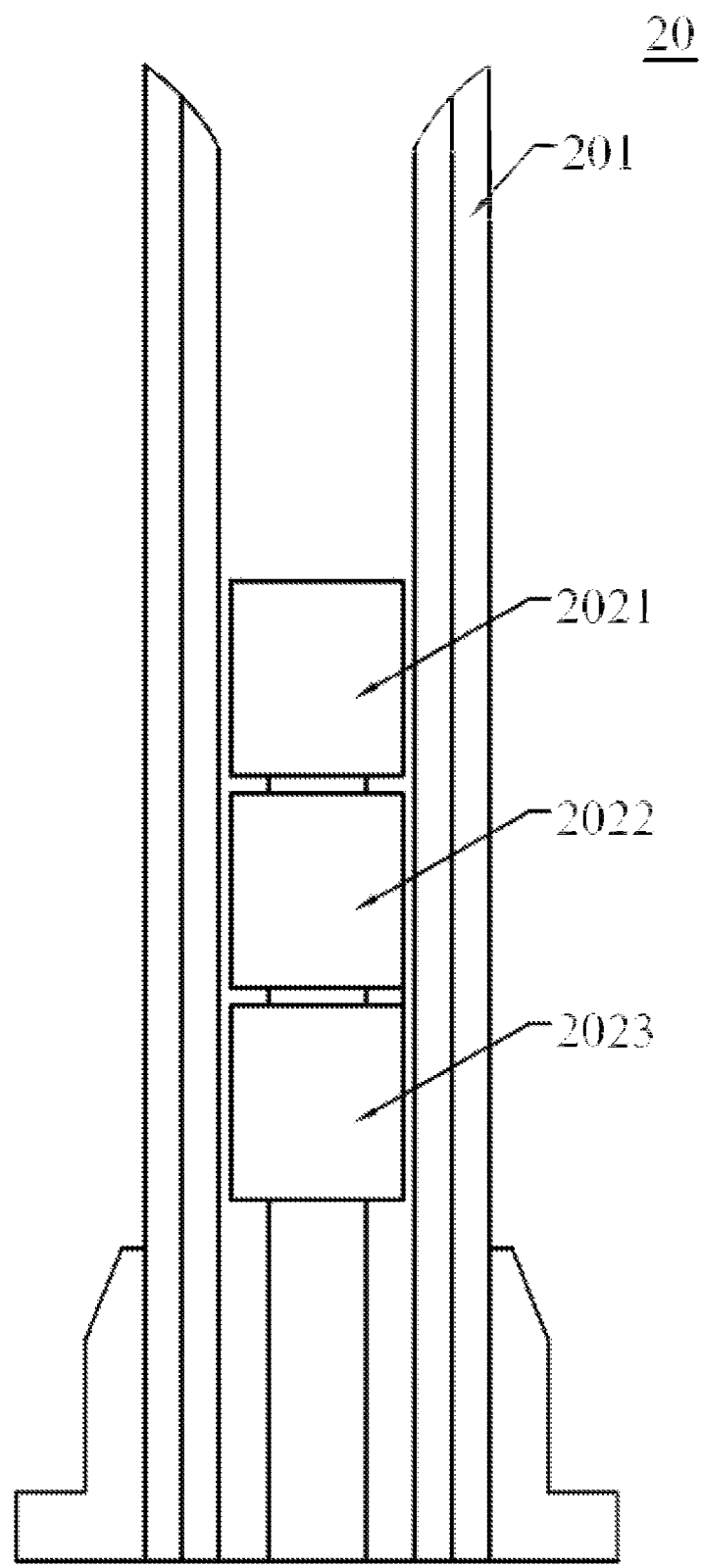
FIG. 2 illustrates a vertical cross-sectional view of an inserting jig in accordance with one embodiment of the present invention.
Figure 3:
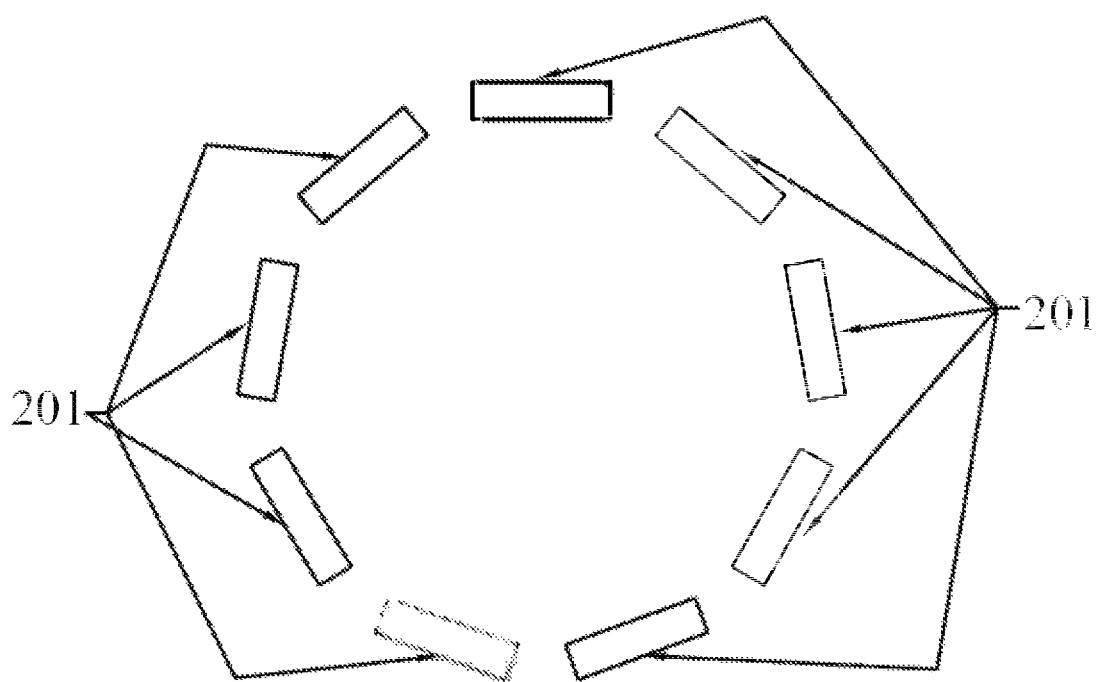
FIG. 3 illustrates a top view of strip-shaped portions of the inserting jig of FIG. 2 in accordance with one embodiment of the present invention.
Figure 5:
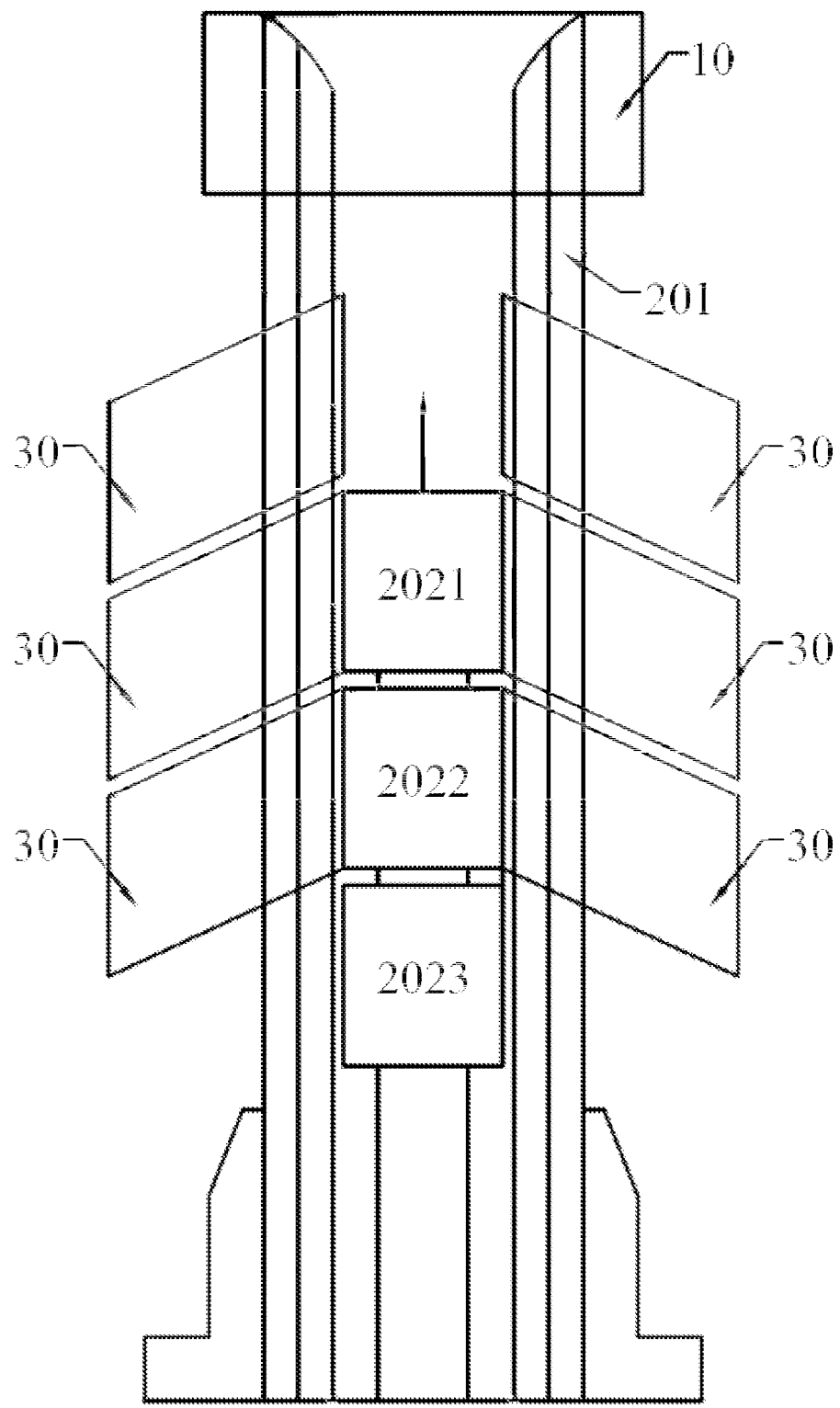
FIG. 5 illustrates a vertical cross-sectional view of the inserting jig disposed with the coils and the stator core thereon in accordance with one embodiment of the present invention.

The stator core winding method for the motor of the present invention utilizes an inserting jig to introduce the coils into every core cavity in the stator core 10. FIG. 2 illustrates a vertical cross-sectional view of the inserting jig in accordance with one embodiment of the present invention. FIG. 3 illustrates a top view of the strip-shaped portion of the inserting jig of FIG. 2. FIG. 5 illustrates a vertical cross-sectional view of the inserting jig disposed with the coils and the stator core thereon in accordance with one embodiment of the present invention. As shown in FIGS. 2, 3 and 5, the inserting jig 20 includes a plurality of strip-shaped portions 201 arranged annularly and spaced apart in a determined distance to pass through the coils 30 of different phases and dispose the coils 30 thereon. The diameter of the outer circle of the ring shape formed by the plurality of strip-shaped portions 201 is substantially equal to the diameter of the inner circle formed by the edge of the cavity wall 111 of the stator core 10 adjacent to the center of the stator core 10. The number of the strip-shaped portions 201 corresponds to the number of the core cavities in the stator core 10. In one embodiment, the number of the strip-shaped portions 201 may be 9, 12, 15 or 18. The aforementioned number of the strip-shaped portions 201 is described for illustrating the present invention but not for limiting the present invention. The positions of the strip-shaped portions 201 correspond to the positions of the cavity walls 111 between every core cavities.

Figure 4:
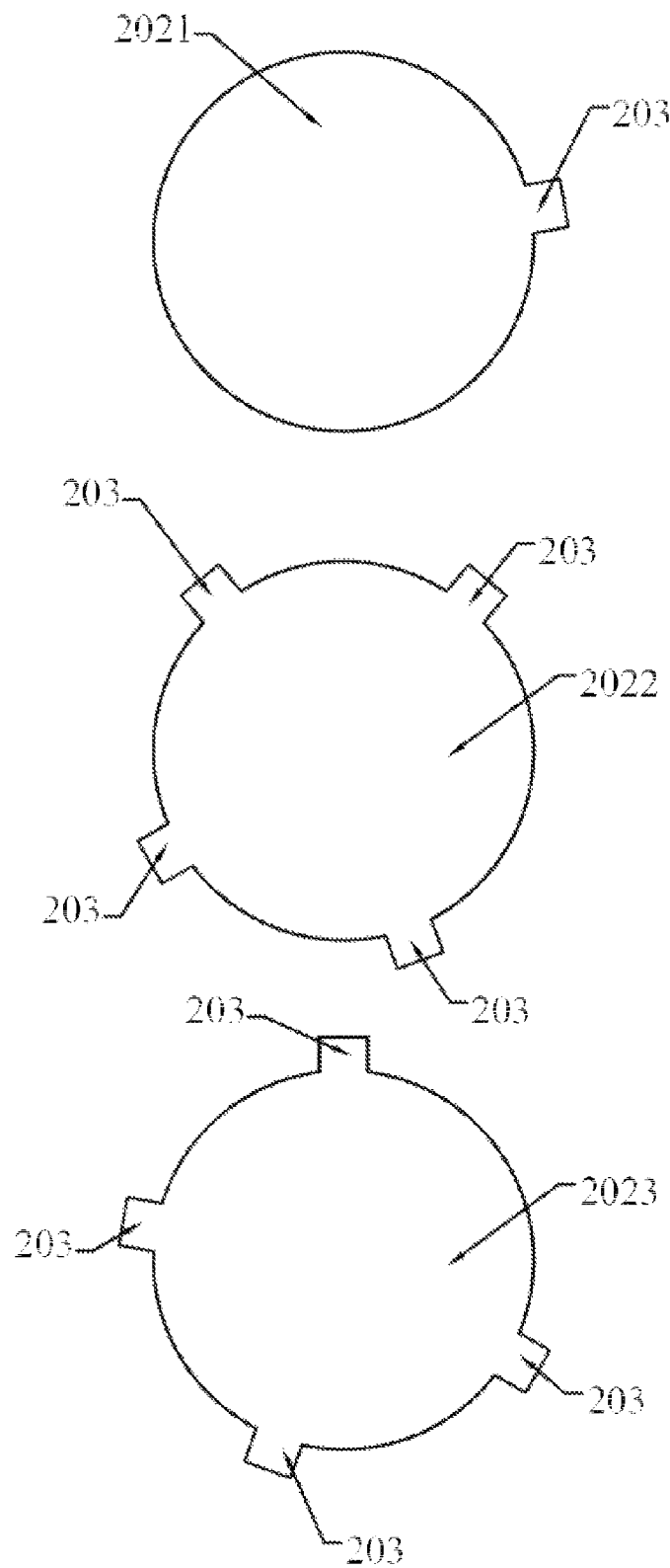
FIG. 4 illustrates a horizontal cross-sectional view of each pushing element of the inserting jig of FIG. 2 in accordance with one embodiment of the present invention.

As shown in FIGS. 2 and 5, a plurality of pushing elements, for example three vertically connected pushing elements 2021, 2022 and 2023, are disposed in the cylindrical space formed by the strip-shaped portions 201 to push the coils 30 of different phases on the strip-shaped portions 201 upwards and into the core cavities in the stator core 10. FIG. 4 illustrates a cross-sectional view of each pushing element 2021-2023. In one embodiment, as shown in FIG. 4, the pushing elements 2021-2023 include one or a plurality of projected portions 203 adjacent to the edges of the strip-shaped portions 201 to push specific coils 30 disposed above specific pushing element upwards and into specific core cavity in the stator core 10. The positions of the projected portions 203 of the pushing elements 2021-2023 correspond to the positions of the cavity walls 111 between the core cavities to be introduced with the coils during each stage. In one embodiment, as shown in FIG. 4, the position of the projected portion 203 of the pushing element 2021 corresponds to the position of the cavity wall 111 between the eighth core cavity 108 and the ninth core cavity 109. The positions of the projected portions 203 of the pushing element 2022 respectively correspond to the positions of the cavity wall 111 between the first core cavity 101 and the ninth core cavity 109, the cavity wall 111 between the second core cavity 102 and the third core cavity 103, the cavity wall 111 between the fourth core cavity 104 and the fifth core cavity 105 and the cavity wall 111 between the sixth core cavity 106 and the seventh core cavity 107. The positions of the projected portions 203 of the pushing element 2023 respectively correspond to the positions of the cavity wall 111 between the first core cavity 101 and the second core cavity 102, the cavity wall 111 between the third core cavity 103 and the fourth core cavity 104, the cavity wall 111 between the fifth core cavity 105 and the sixth core cavity 106 and the cavity wall 111 between the seventh core cavity 107 and the eighth core cavity 108.

The stator core winding method for the motor of the present invention will be described with the stator core having nine core cavities as an example. As shown in FIGS. 7 and 8, a stator core and an inserting jig are prepared initially in step 401. The stator core includes a first core cavity, a second core cavity, a third core cavity, a fourth core cavity, a fifth core cavity, a sixth core cavity, a seventh core cavity, an eighth core cavity and a ninth core cavity. Then, in step 402, first phase coils, for example phase A coils, are put on the strip-shaped portions of the inserting jig corresponding to the positions of the cavity wall between the first core cavity and the second core cavity and the cavity wall between the seventh core cavity and the eighth core cavity, and a second phase coil, for example a phase B coil, is put on the strip-shaped portion of the inserting jig corresponding to the position of the cavity wall between the fifth core cavity and the sixth core cavity. A third phase coil, for example a phase C coil, is put on the strip-shaped portion of the inserting jig corresponding to the position of the cavity wall between the third core cavity and the fourth core cavity. Subsequently, in step 403, the first phase coil, for example the phase A coil, is put on the strip-shaped portion of the inserting jig corresponding to the position of the cavity wall between the fourth core cavity and the fifth core cavity, and the second phase coil, for example the phase B coil, is put on the strip-shaped portion of the inserting jig corresponding to the position of the cavity wall between the second core cavity and the third core cavity. The third phase coils, for example the phase C coils, are put on the strip-shaped portions of the inserting jig corresponding to the positions of the cavity wall between the first core cavity and the ninth core cavity and the cavity wall between the sixth core cavity and the seventh core cavity. Then, in step 404, the second phase coil, for example the phase B coil, is put on the strip-shaped portion of the inserting jig corresponding to the position of the cavity wall between the eighth core cavity and the ninth core cavity.

Figure 9:
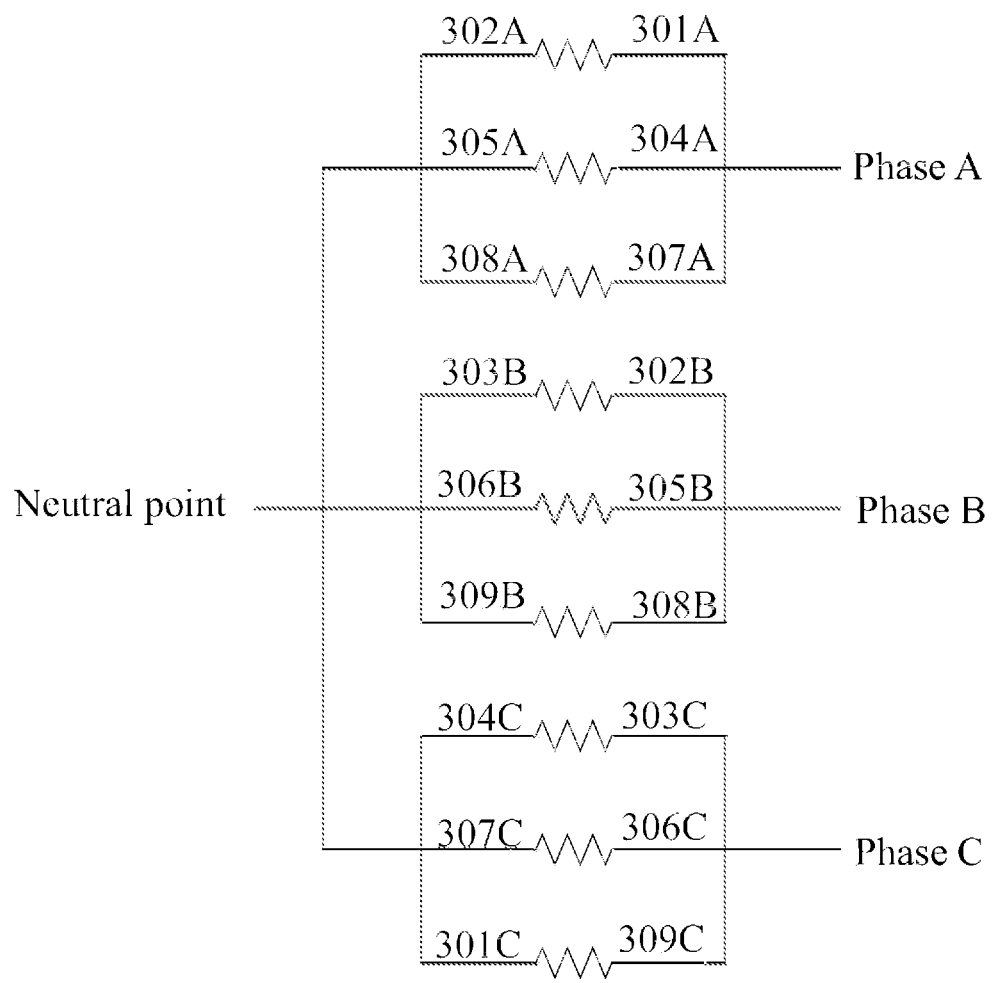
FIG. 9 illustrates a wiring diagram of the coils in each core cavity in accordance with one embodiment of the present invention.

Subsequently, in step 405, the top of the inserting jig is placed into the stator core to render the outer surfaces of the strip-shaped portions to attach the edges of the cavity walls adjacent to the center of the stator core, and a plurality of pushing elements of the inserting jig are moved upwards to pass through the stator core, so as to push the coils of different phases into the core cavities in the stator core. Then, in step 406, in accordance with a wiring diagram shown in FIG. 9, the first phase coils in the core cavities, for example the first phase coil 301A in the first core cavity, the first phase coil 304A in the fourth core cavity and the first phase coil 307A in the seventh core cavity, are connected to one another for example by welding as phase A, and the second phase coils in the core cavities, for example the second phase coil 302B in the second core cavity the second phase coil 305B in the fifth core cavity, and the second phase coil 308B in the eighth core cavity, are connected to one another for example by welding as phase B. The third phase coils in the core cavities, for example the third phase coil 303C in the third core cavity the third phase coil 306C in the sixth core cavity and the third phase coil 309C in the ninth core cavity, are connected to one another for example by welding as phase C, and the first phase coil 302A in the second core cavity, the first phase coil 305A in the fifth core cavity, the first phase coil 308A in the eighth core cavity, the second phase coil 303B in the third core cavity, the second phase coil 306B in the sixth core cavity, the second phase coil 309B in the ninth core cavity, the third phase coil 304C in the fourth core cavity, the third phase coil 307C in the seventh core cavity and the third phase coil 301C in the first core cavity are connected to one another for example by welding as a natural point. Finally, in step 407, the outer shape of the coils of different phases is shaped by a shaping machine to the smallest to complete the winding procedure of the stator core of the motor.

In another embodiment of the present invention, the first phase coil may be phase B coil, the second phase coil may be phase C coil and the third phase coil may be phase A coil. In still another embodiment of the present invention, the first phase coil may be phase C coil, the second phase coil may be phase A coil and the third phase coil may be phase B coil. In one embodiment, the coils of different phases may be formed with a winding machine by using a concentrative inserting based winding method.

Figure 6:
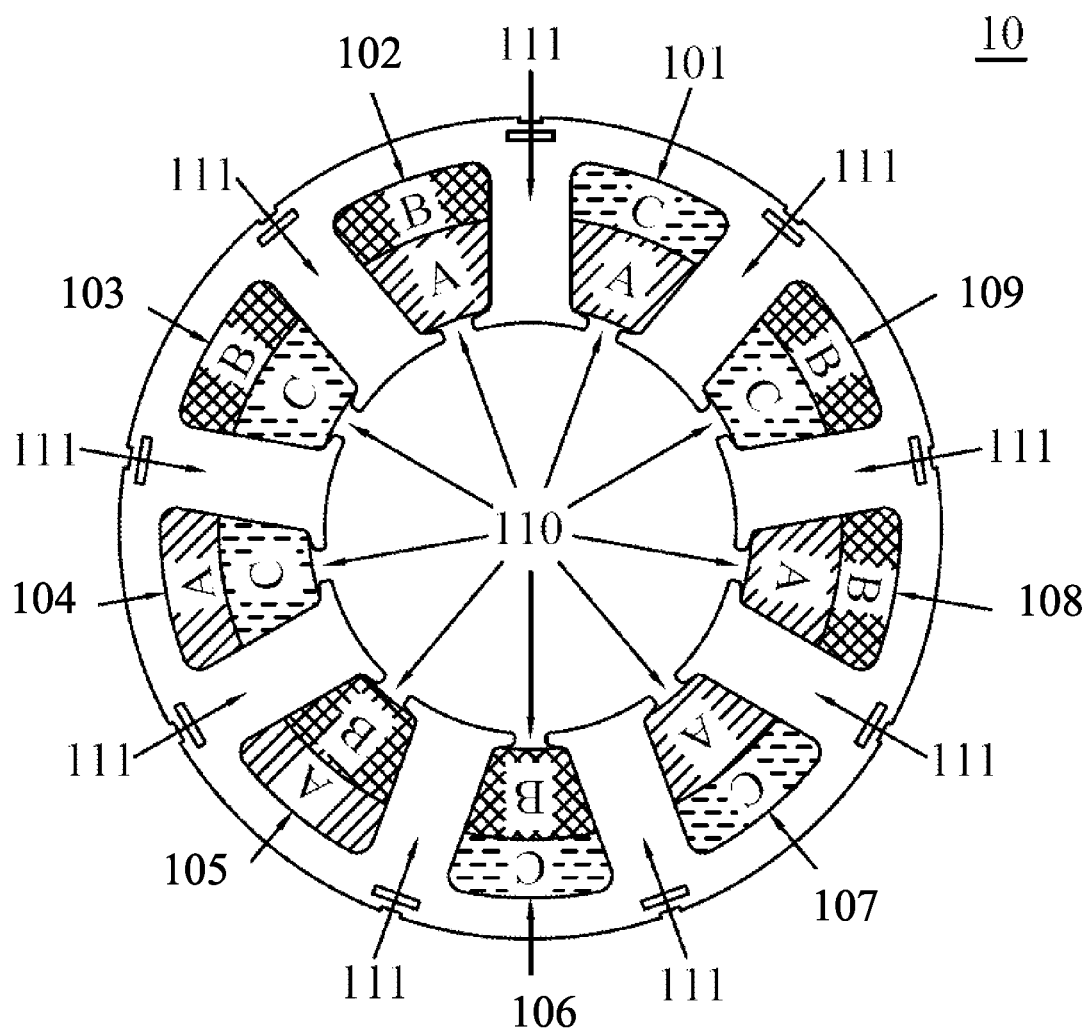
FIG. 6 illustrates a diagram of the completed stator core of the motor in accordance with one embodiment of the present invention.

In one embodiment of the present invention, the completed stator core is shown in FIG. 6. One side of the first core cavity 101 adjacent to the center of the stator core is disposed with the first phase coil, for example phase A coil while the other side of the first core cavity 101 far from the center of the stator core is disposed with the third phase coil, for example phase C coil. One side of the second core cavity 102 adjacent to the center of the stator core is disposed with the first phase coil, for example phase A coil while the other side of the second core cavity 102 far from the center of the stator core is disposed with the second phase coil, for example phase B coil. One side of the third core cavity 103 adjacent to the center of the stator core is disposed with the third phase coil, for example phase C coil while the other side of the third core cavity 103 far from the center of the stator core is disposed with the second phase coil, for example phase B coil. One side of the fourth core cavity 104 adjacent to the center of the stator core is disposed with the third phase coil, for example phase C coil while the other side of the fourth core cavity 104 far from the center of the stator core is disposed with the first phase coil, for example phase A coil.

One side of the fifth core cavity 105 adjacent to the center of the stator core is disposed with the second phase coil, for example phase B coil while the other side of the fifth core cavity 105 far from the center of the stator core is disposed with the first phase coil, for example phase A coil. One side of the sixth core cavity 106 adjacent to the center of the stator core is disposed with the second phase coil, for example phase B coil while the other side of the sixth core cavity 106 far from the center of the stator core is disposed with the third phase coil, for example phase C coil. One side of the seventh core cavity 107 adjacent to the center of the stator core is disposed with the first phase coil, for example phase A coil while the other side of the seventh core cavity 107 far from the center of the stator core is disposed with the third phase coil, for example phase C coil. One side of the eighth core cavity 108 adjacent to the center of the stator core is disposed with the first phase coil, for example phase A coil while the other side of the eighth core cavity 108 far from the center of the stator core is disposed with the second phase coil, for example phase B coil. One side of the ninth core cavity 109 adjacent to the center of the stator core is disposed with the third phase coil, for example phase C coil while the other side of the ninth core cavity 109 far from the center of the stator core is disposed with the second phase coil, for example phase B coil.

In another embodiment of the present invention, the first phase coil may be phase B coil, the second phase coil may be phase C coil and the third phase coil may be phase A coil. In still another embodiment of the present invention, the first phase coil may be phase C coil, the second phase coil may be phase A coil and the third phase coil may be phase B coil.

The three phase inductances ($L_{AB}$, $L_{BC}$ and $L_{CA}$) of the stator core completed by the stator core winding method of the present invention can be metered by a LCR impedance meter, and the frequency of metering can be 1 KHz. In one embodiment, the three phase inductances ($L_{AB}$, $L_{BC}$ and $L_{CA}$) metered by the LCR impedance meter are 126.80μH, 127.50μH and 129.50μH. The inductance unbalance ($L_{unb}$) of the stator core of the motor can be calculated from the metered three phase inductances ($L_{AB}$, $L_{BC}$ and $L_{CA}$) by using an inductance unbalance calculating function. In one embodiment, the inductance unbalance calculating function may be as follows:

$$L_{unb} = \sqrt{\frac{1}{3}\sum\left[\frac{(L_i - L_{ave})}{L_{ave}}\right]^2}$$

$$L_{ave} = \frac{1}{3}\sum L_i$$

wherein i=AB, BC, CA.

In one embodiment, after the metered three phase inductances ($L_{AB}$=126.80 μH, $L_{BC}$=127.50 μH and $L_{CA}$=129.50 μH) are introduced into the aforementioned inductance unbalance calculating function, the inductance unbalance ($L_{unb}$) of the stator core of the motor is 0.894%, which is one third of the inductance unbalance of the stator core completed by the traditional winding method. Therefore, the stator core winding method for the motor of the present invention can greatly decrease the unbalance between the three phase inductances of the stator core of the motor so as to enhance the performance of the motor.

The foregoing description is a preferred embodiment of the present invention. It should be appreciated that this embodiment is described for purposes of illustration only, not for limiting, and that numerous alterations and modifications may be practiced by those skilled in the art without departing from the spirit and scope of the invention. It is intended that all such modifications and alterations are included insofar as they come within the scope of the invention as claimed or the equivalents thereof.

The invention claimed is:

1. A stator core winding method for a motor, comprising:
preparing a stator core including a plurality of core cavities, wherein said plurality of core cavities include a first core cavity, a second core cavity, a third core cavity, a fourth core cavity, a fifth core cavity, a sixth core cavity, a seventh core cavity, an eighth core cavity and a ninth core cavity;
winding a pair of second-phase coils into said eighth core cavity and said ninth core cavity of said plurality of core cavities of said stator core;
winding a pair of first-phase coils into said fourth core cavity and said fifth core cavity of said plurality of core cavities of said stator core, a pair of said second-phase coils into said second core cavity and said third core cavity of said plurality of core cavities of said stator core, and two pairs of third-phase coils into said ninth core cavity and said first core cavity as well as said sixth core cavity and said seventh core cavity of said plurality of core cavities of said stator core respectively; and
winding two pairs of said first-phase coils into said first core cavity and said second core cavity as well as said seventh core cavity and said eighth core cavity of said plurality of core cavities of said stator core respectively, a pair of said second-phase coils into said fifth core cavity and said sixth core cavity of said plurality of core cavities of said stator core, and a pair of said third-phase coils into said third core cavity and said fourth core cavity of said plurality of core cavities of said stator core.

2. The method of claim 1, further comprising a step of connecting said first-phase coils in said second core cavity, said fifth core cavity and said eighth core cavity, said second-phase coils in said third core cavity, said sixth core cavity and said ninth core cavity, and said third-phase coils in said fourth core cavity, said seventh core cavity and said first core cavity to one another to form a neutral point.

3. The method of claim 1, further comprising:
preparing an inserting jig, wherein said inserting jig includes a plurality of strip-shaped portions and a plurality of connected pushing elements, wherein said plurality of pushing elements include one or a plurality of projected portions;
putting said first-phase coils, said second-phase coils and said third-phase coils on said plurality of strip-shaped portions of said inserting jig; and
placing a top of said inserting jig into said stator core and moving said plurality of connected pushing elements of said inserting jig upwards to pass through said stator core.

4. The method of claim 1, further comprising a step of connecting said first-phase coils in said first core cavity, said fourth core cavity and said seventh core cavity to one another to form a first phase.

5. The method of claim 1, further comprising a step of shaping outer shapes of said first-phase coils, said second-phase coils and said third-phase coils by a shaping machine.

6. The method of claim 1, further comprising a step of connecting said second-phase coils in said second core cavity, said fifth core cavity and said eighth core cavity to one another to form a second phase.

7. The method of claim 1, further comprising a step of connecting said third-phase coils in said third core cavity, said sixth core cavity and said ninth core cavity to one another to form a third phase.

* * * * *